(12) United States Patent
Manzoor

(10) Patent No.: US 8,117,943 B2
(45) Date of Patent: Feb. 21, 2012

(54) DECOUPLED VIBRATION DAMPER

(75) Inventor: Suhale Manzoor, Cement City, OH (US)

(73) Assignee: Metavation, LLC, Southfield, MI (US)

( * ) Notice: Subject to any disclaimer, the term of this patent is extended or adjusted under 35 U.S.C. 154(b) by 1182 days.

(21) Appl. No.: 11/861,921

(22) Filed: Sep. 26, 2007

(65) Prior Publication Data

US 2009/0078078 A1    Mar. 26, 2009

(51) Int. Cl.
  F16C 15/00    (2006.01)
  F16F 15/12    (2006.01)
  F16D 3/00     (2006.01)
(52) U.S. Cl. ........... 74/574.4; 74/572.2; 464/73; 464/74
(58) Field of Classification Search ................ 74/574.4, 74/572.2; 464/73, 74; 254/327; 301/37.33; 29/278; 280/731
  See application file for complete search history.

(56) References Cited

U.S. PATENT DOCUMENTS

| | | | |
|---|---|---|---|
| 1,758,274 A | 5/1930 | Butenkoff | |
| 1,790,614 A * | 1/1931 | Leipert | 464/74 |
| 1,894,432 A * | 1/1933 | Watson | 254/327 |
| 2,159,235 A * | 5/1939 | Tyler et al. | 74/574.4 |
| 2,779,211 A | 1/1957 | Henrich | |
| 3,136,178 A | 6/1964 | O'Connor | |
| 3,285,096 A | 11/1966 | O'Connor | |
| 3,462,136 A | 8/1969 | Rumsey | |
| 3,577,802 A | 5/1971 | Rumsey | |
| 4,044,628 A | 8/1977 | Jacks | |
| 4,537,580 A | 8/1985 | Loizeau et al. | |
| 4,914,949 A | 4/1990 | Andra et al. | |
| 5,109,727 A | 5/1992 | Joyce | |
| 5,209,461 A | 5/1993 | Whightsil, Sr. | |
| 5,352,157 A | 10/1994 | Ochs et al. | |
| 5,564,981 A * | 10/1996 | Iwabuchi et al. | 464/73 |
| 5,735,746 A | 4/1998 | Colford | |
| 5,873,786 A * | 2/1999 | Hosoya et al. | 464/73 |
| 6,031,034 A | 2/2000 | Morimoto et al. | |
| 6,216,327 B1 * | 4/2001 | Hendrian | 29/278 |
| 6,308,810 B1 | 10/2001 | Kuwayama | |
| 6,675,759 B2 | 1/2004 | Johnson et al. | |
| 6,682,060 B2 | 1/2004 | Kato et al. | |
| 6,725,985 B2 | 4/2004 | Haneishi et al. | |
| 6,883,653 B2 | 4/2005 | Kato et al. | |
| 7,055,243 B2 | 6/2006 | Hodjat et al. | |
| 7,150,679 B2 | 12/2006 | Pape et al. | |
| 2001/0010109 A1 | 8/2001 | Jager | |
| 2003/0024345 A1 | 2/2003 | Hodjat et al. | |
| 2004/0007858 A1 * | 1/2004 | Simonian et al. | 280/731 |
| 2004/0245847 A1 * | 12/2004 | Hasegawa | 301/37.33 |
| 2008/0105080 A1 * | 5/2008 | Christenson | 74/574.4 |
| 2009/0000421 A1 * | 1/2009 | Christenson et al. | 74/574.4 |

OTHER PUBLICATIONS

International Search Report and Written Opinion, PCT/US08/76513, mailed Nov. 24, 2008.

\* cited by examiner

*Primary Examiner* — Vinh T. Luong

(74) *Attorney, Agent, or Firm* — Wood, Herron & Evans, LLP

(57) ABSTRACT

A torsional vibration damper includes a one-piece integral hub and annular inertia mass assembly. Between the hub and the inertia mass are intermediate rings connected integrally with the mass and the hub connected integral spokes. Elastomeric members are compression fitted within spaces formed between the hub and the mass.

10 Claims, 3 Drawing Sheets

DECOUPLED VIBRATION DAMPER

BACKGROUND OF THE INVENTION

Torsional vibration dampers are employed extensively in internal combustion engines to reduce torsional vibrations delivered to rotatable shafts. The torsional vibrations may be of considerable amplitude, and, if not abated, can potentially damage gears or similar structures attached to the rotatable shaft and cause fatigue failure of the rotatable shaft.

Torsional vibration dampers convert the kinetic vibrational energy by dissipating it to thermal energy as a result of damping. The absorption of the vibrational energy lowers the strength requirements of the rotatable shaft and thereby lowers the required weight of the shaft. The torsional vibration damper also has a direct effect on inhibiting vibration of nearby components of the internal combustion engine that would be affected by the vibration.

The simplest insertion style torsional vibration damper has three components, a hub that allows the damper to be rigidly connected to the source of the vibration, an inertia ring, and an elastomeric strip in the same shape as the ring. The elastomeric strip provides the spring dashpot system for the damper. The hub and the inertia ring are manufactured individually and machined before the elastomer is inserted by force into the gap that is present between the hub and the inertia ring. The elastomer is compressed and exerts a pressure between the metallic surfaces of the ring and hub, holding the assembly in place. There are several design problems with these dampers.

The bore of the hub and grooves in the ring have to meet very tight tolerances with respect to each other radially and axially. That sometimes forces the parts to be machined after assembly. With two separate parts, there can be two separate machining steps. The elastomer assembly process contributes to wavy rubber and, hence, product scrap. Further, the hub of the damper adds parasitic inertia to the system.

For any mechanical system, the torsional natural frequency depends upon the inertia, torsional stiffness and damping of the system. In the traditional torsional vibration damper, the inertia is provided by the inertia ring, while the damping and torsional stiffness are provided by the elastomer strip. This otherwise implies that the hub is, in fact, a rigid attachment that does not provide any significant help to the damping system except to provide a rigid means of connection to the rotating component of the vehicle. Thus, the damping, by definition, is caused by energy dissipation in the form of heat due to frictional and/or other causes. In the standard torsional vibration damper, the shearing of the elastomer between the hub outer diameter and the ring inner diameter causes the relative motion of the elastomer and, therefore, promotes damping. This inherently causes a strain buildup in the elastomer.

SUMMARY OF THE INVENTION

The present invention is premised on the realization that a torsional vibration damper suitable for automotive applications, as well as others, can be formed with an integral hub/inertia mass structure. The inner hub is connected to the inertia ring by a series of spokes which, in turn, lead to intermediate rings connected, in turn, to the inertia ring by outer spokes. This provides generally arcuate regions between the hub and the intermediate ring or rings, as well as between the rings and the inertia ring. The spokes and rings are designed to flex and/or deform in use. At least some of the arcuate openings are filled with elastomeric members that provide the dashpot. The dashpots are forced into these arcuate openings and held in position by pressure that they exert on the metallic surfaces. The bending of the spokes and rings deforms the arcuate spaces and the elastomeric inserts thereby absorb and/or dampen vibration.

This design allows the inertia ring grooves and the hub bore, and the washer face to be machined in a single operation, thereby eliminating the run-out issues seen in the assembly of traditional torsional vibration dampers.

The objects and advantages of the present invention will be further appreciated in light of the following detailed description and drawings in which:

DETAILED DESCRIPTION

Figure 1:
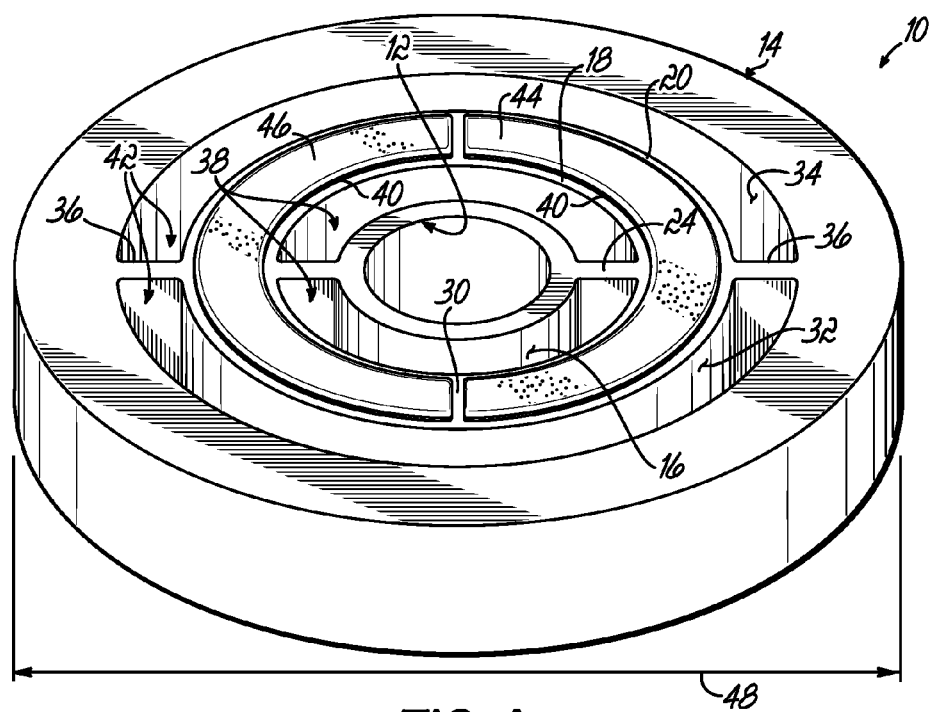
FIG. 1 is an isometric view of a torsional vibration damper made according to the present invention.

As shown in FIG. 1, the present invention is a damper 10 that includes a hub 12 and an outer annular inertia mass 14 formed integrally with the hub. Between the outer peripheral surface 16 of hub 12 and the inertia mass 14 are a first inner ring 18 and a second intermediate ring 20. The first inner ring 18 is connected to the outer surface 16 of hub 12 by first innermost spokes 24 which extend from the inner surface 22 of ring 18 to the outer surface 16 of hub 12. Extended between the outer surface 26 of ring 18 and the inner surface 28 of ring 20, are a second set of intermediate spokes 30, which connect the inner ring 18 to the intermediate ring 20. Finally, extended between the outer surface 32 of ring 20 to the inner surface 34 of inertia mass 14, are a third set of outer spokes 36. Preferably, the hub 12, inertia mass 14, as well as rings 18 and 20 and spokes 24, 30 and 36, are all integrally formed.

This structure defines innermost arcuate spaces 38 between the hub 12 and the first inner ring 18 and spokes 24. Intermediate arcuate spaces 40 are then formed between rings 18 and 20 and spokes 30, and outermost arcuate spaces 42 are formed between the ring 20 and inertia mass 14 bordered by the third spokes 36. Arcuate spaces 40, in turn, are filled by first and second elastomeric members or dashpots 44 and 46 respectively.

The damper 10 is designed to absorb vibration in a defined frequency ranges within permitted space limitations. Thus, the thickness of the overall damper 10, the total mass of the inertia mass 14, as well as its total inertia, and the thickness of the spokes and inner and outer rings, can all be varied in order to achieve desired dampening.

In a typical automotive application, the diameter 48 of damper 10 can be anywhere from about 100 mm to about 200 mm. The general inertia requirements may vary widely and can be anywhere from about 5000 kg·mm$^2$ to about 30,000 kg·mm$^2$. Typical torsional damper vibration widths 49 are usually from about 20 mm to about 60 mm.

The design limitations of the spokes and rings will vary also, depending upon the particular material used to form the damper. The damper can be formed from any metal used for torsional vibration dampers. These include steel, ductile iron, grey iron and aluminum, as well as composites. Again the physical characteristics of the material will affect the design of the damper 10.

The damper, including the hub, inner ring, intermediate ring, inertia ring, and spokes, are all integrally formed. These can be formed in a variety of different manners. It can be extruded, cast and subsequently machined, shell molded, or completely machined.

When casting the damper, it is important to maintain the tight casting tolerances in the metallic surfaces that constitute the torsional spring. If the metallic thickness varies, then so will the frequency from part to part.

Once the damper is initially formed, the inertia ring grooves and hub bore (not shown), and washer face can all be machined in a single operation.

Figure 1A:
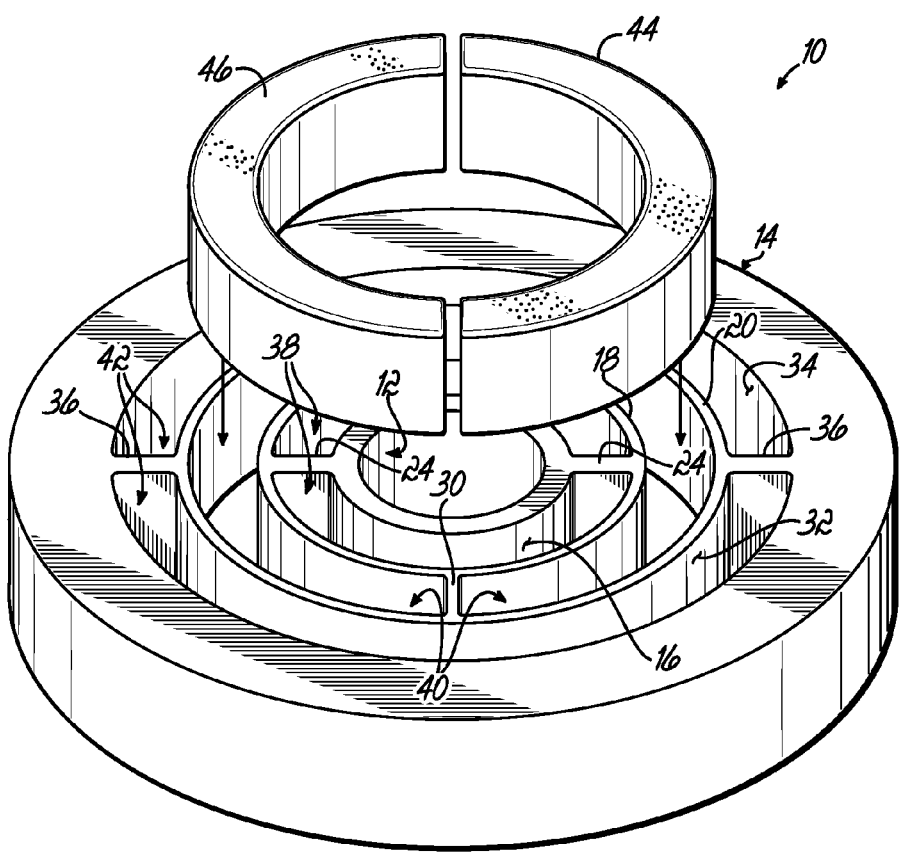
FIG. 1A is an exploded view of the vibration damper shown in FIG. 1.

The dashpots 44 and 46 can be formed by extrusion or injection molding. These are formed from an elastomeric material having a damping coefficient designed to meet end use requirements. Suitable elastomeric materials include chlorobutyl, bromobutyl, nitrile rubber, butyl rubber, and EPDM, we well as others. Preferably, the damping coefficient of the rubber member should be about 7% to about 25%. Once the damper is formed and machined, the elastomeric members are compression fitted into the desired arcuate spaces. As shown in FIGS. 1 and 1A, the elastomeric members 44 and 46 are compression fitted into the intermediate arcuate spaces 40. Generally, these will be under about 30% percentage compression. Again this can be modified depending upon design limitation.

The damper 10 can be modified in a variety of different manners, again designed to achieve end use requirements.

Figure 2:
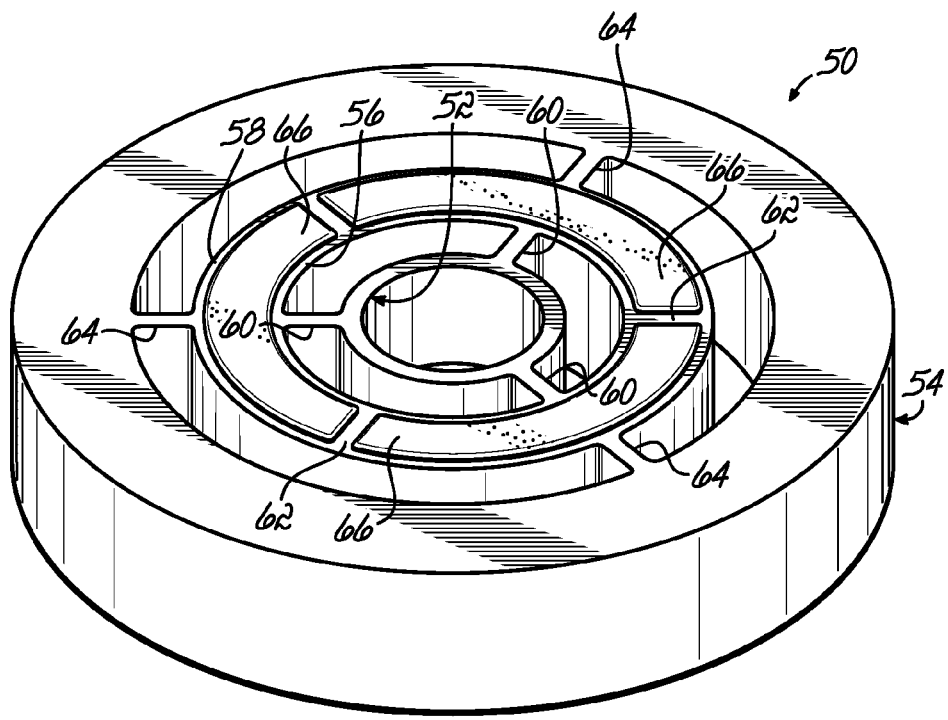
FIG. 2 is an isometric view of an alternate embodiment of the present invention.

A first alternate embodiment of the present invention is shown in FIG. 2. In this embodiment, the damper 50 includes an inner hub 52, an outer inertia mass 54, and an inner ring 56, and an intermediate ring 58. The hub 52 is connected to the inner ring 56 by three spokes 60. Likewise, the inner ring 56 is connected to the intermediate ring 58 with three spokes 62, and the outer ring is connected to the inertia mass 54 by three spokes 64. Three arcuate elastomeric members or dashpots 66 are located between the three spokes 62 between the inner ring and the outer ring. This effectively stiffens the torsional spring and restrains the motion of the absorption or dashpot system, reduces the strain on the elastomer, but correspondently reduces the damping of the system.

Figure 3:
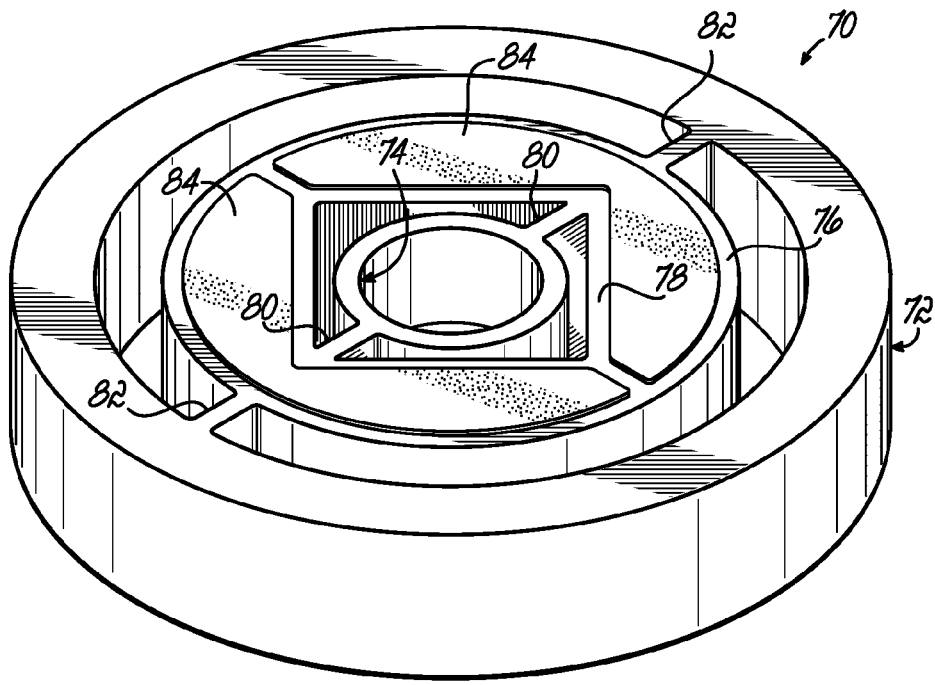
FIG. 3 is an isometric view of a second alternate embodiment of the present invention.

FIG. 3 shows a second alternate embodiment in which the damper 70 includes an inertia mass 72, an inner hub 74 and an intermediate ring 76. Instead of an inner ring, as shown in FIGS. 1 and 2, the damper 70 has a rectangular member 78 which surrounds the hub 74 and is connected to the hub by spokes 80. the ring 76, in turn, is attached to the inertia mass 72 by spokes 82. Elastomeric members or dashpots 84 are located between the rectangular member 78 and the ring 76. This change in geometry can be made to accommodate enlarged elastomeric members or dashpots, and to provide necessary stiffness. There are basically unlimited methods of adjusting the spring geometry by varying the geometries of the various portions.

Figure 4:
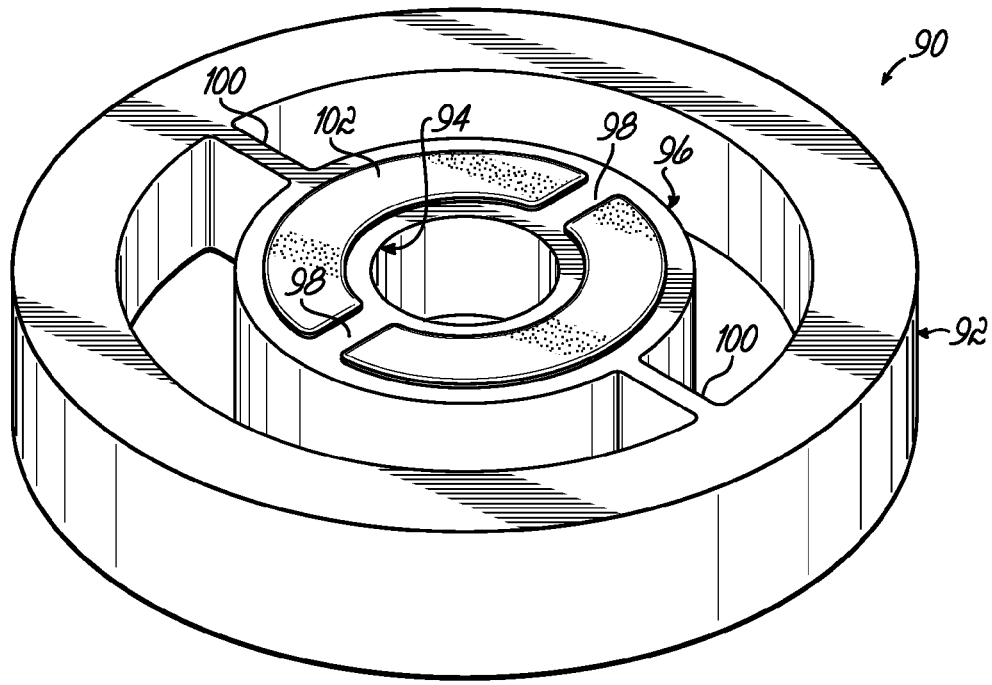
FIG. 4 is an isometric view of a third alternate embodiment of the present invention.

A third option is shown in FIG. 4. The damper 90 again includes an inertia mass 92 and a hub 94. There is a single intermediate ring 96 between the hub 94 and the inertia mass 92. A first set of spokes 98 extend between the hub and the intermediate ring 96 and a second series of spokes 100 extend between the intermediate ring 96 and the inertia mass 92. As shown, the spokes 98 are wider than spokes 100 to increase stiffness. Again, elastomeric members 102 are located in the arcuate space between the hub 94 and the intermediate ring 96.

Figure 5:
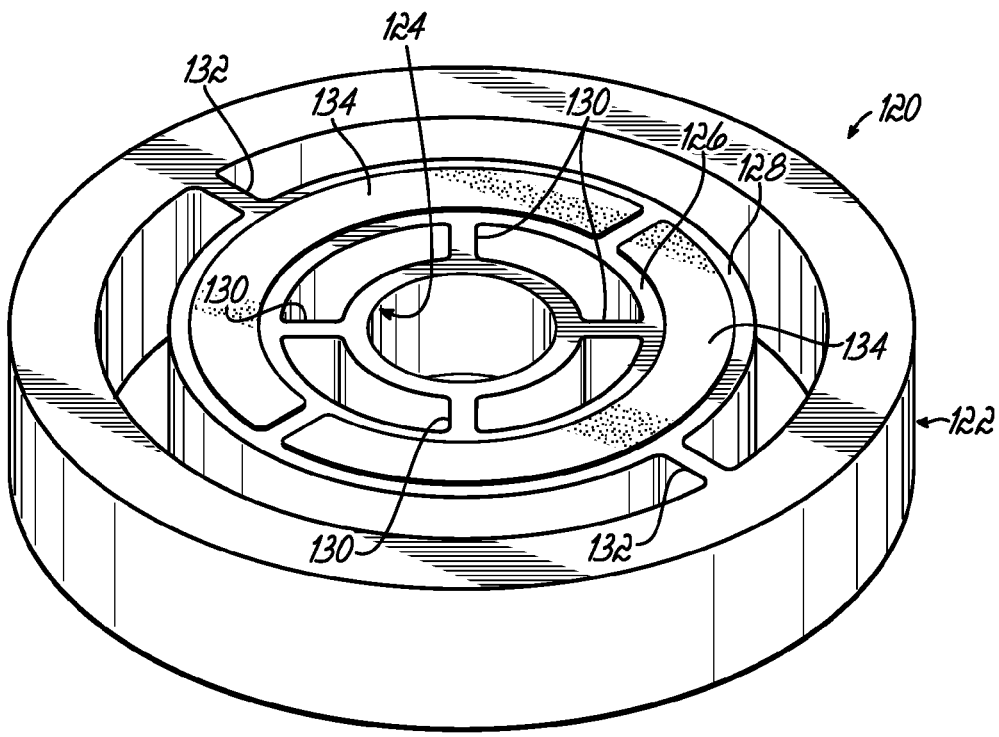
FIG. 5 is an isometric view of a fourth alternate embodiment of the present invention.

FIG. 5 shows an additional embodiment. The damper 120 again has an outer inertia mass 122 and an inner hub 124. First and second rings 126 and 128 are positioned between the hub 124 and the inertia mass 122. In this embodiment the hub is connected to the first ring 126 by a set of four spokes 130. The ring 128, in turn, is connected to the inertia mass 122 by a set of two spokes 132. Dashpots 134 are then located in the arcuate spaces between rings 126 and 128.

Further, the dashpot number and location can be changed to obtain the required amount of damping. For example, in any of these embodiments, any arcuate space can be filled with an elastomeric member or dashpot to increase damping. Further, alternate materials can be used instead of the elastomers, such as thermoplastic elastomers, foams or silicone derivatives to provide required damping.

Thus, the damper of the present invention can be modified in a wide variety of ways to achieve end use requirements. Further, the slip torque of all of the designs is extremely high, since the only mode of failure would be failure of the metallic spokes. Elastomer fatigue should not be an issue with the present invention because the elastomer is not in shear in the traditional sense, but goes through more of a compression state of stress. Further, the elastomeric members may only need to be compressed less than 30%. The manufacture of the damper is simplified, and, therefore, costs reduced because the entire metallic portion of the damper can be machined in a single chuck operation, which should promote axial and radial run out. Finally, the damper can be more compact because everything beyond the outer periphery of the hub acts as part of the spring system for the damper, whereas in a traditional torsional vibration damper, anything inside the elastomeric member did not contribute to the damping and was basically parasitic mass.

This has been a description of the present invention along with the preferred method of practicing the present invention. However, the invention itself should only be defined by the appended claims.

What is claimed is:

1. A vibration damper comprising an outer annular mass, an intermediate ring and a hub, said intermediate ring fixed to said hub by inner spokes extending between said hub and an inner surface of said intermediate ring;

said intermediate ring fixed to said mass by outer spokes extending between an outer surface of said ring and said mass and peripherally spaced vibration absorbing members positioned between said hub and said mass;

wherein said mass, said inner spokes, said outer spokes, said intermediate ring and said hub are all integral.

2. The vibration damper claimed in claim 1 having two outer spokes separating two vibration absorbing members wherein said members are elastomeric.

3. The vibration damper claimed in claim 1 having three outer spokes separating three vibration absorbing members.

4. The vibration damper claimed in claim 1 wherein said vibration-absorbing members are positioned between said hub and said intermediate ring.

5. A vibration damper comprising an outer annular mass integrally connected to an inner hub by integral spokes;

and a plurality of peripherally spaced vibration-absorbing members lodged between said annular outer mass and said hub, said vibration absorbing members separated by said spokes; and having first and second intermediate rings, said first intermediate ring connected to said hub by a first set of integral spokes, said second intermediate ring connected to said first intermediate ring by a second set of integral spokes, said second intermediate ring connected to said mass by a third set of integral spokes.

6. The vibration damper claimed in claim 5 wherein said vibration absorbing members are positioned between said mass and said second intermediate ring.

7. The vibration damper claimed in claim 5 wherein said vibration absorbing members are positioned between said first and second intermediate rings.

8. The vibration damper claimed in claim 5 wherein said vibration-absorbing members are positioned between said hub and said intermediate ring.

9. The vibration damper claimed in claim 5 wherein vibration absorbing members are positioned between said mass and said second intermediate hub and between said second intermediate ring and said hub.

10. A vibration damper comprising first and second elastomeric members and an integral hub mass assembly, said integral hub mass assembly includes a hub member and an outer annular mass, a plurality of spokes extended from said hub to a first intermediate ring, a plurality of spokes extended from said first intermediate ring to a second intermediate ring, and a plurality of spokes extended from said second intermediate ring to said mass wherein said first and second rings form first and second arcuate spaces and wherein said first and second elastomeric members are positioned within said first and second arcuate spaces and are peripherally spaced and wherein said hub, spokes, rings, and mass are all integral.

\* \* \* \* \*

UNITED STATES PATENT AND TRADEMARK OFFICE
CERTIFICATE OF CORRECTION

PATENT NO. : 8,117,943 B2  Page 1 of 1
APPLICATION NO. : 11/861921
DATED : February 21, 2012
INVENTOR(S) : Suhale Manzoor It is certified that error appears in the above-identified patent and that said Letters Patent is hereby corrected as shown below:

Face Sheet, Item 74 "Inventor: Suhale Manzoor,  should read  --Inventor: Suhale Manzoor,
Cement City, OH (US)"  Cement City, MI (US)--

Signed and Sealed this
Eighth Day of May, 2012

David J. Kappos
*Director of the United States Patent and Trademark Office*